March 11, 1958    F. C. ALBRIGHT    2,826,274
AIRCRAFT WHEEL AND BRAKE ASSEMBLY
Filed Dec. 1, 1949    5 Sheets-Sheet 1

INVENTOR.
FRANKLIN C. ALBRIGHT
BY
ATTORNEY

March 11, 1958 F. C. ALBRIGHT 2,826,274
AIRCRAFT WHEEL AND BRAKE ASSEMBLY
Filed Dec. 1, 1949 5 Sheets-Sheet 2

INVENTOR.
FRANKLIN C. ALBRIGHT
BY
G. A. Gust
ATTORNEY

March 11, 1958 F. C. ALBRIGHT 2,826,274
AIRCRAFT WHEEL AND BRAKE ASSEMBLY
Filed Dec. 1, 1949 5 Sheets-Sheet 3

INVENTOR.
FRANKLIN C. ALBRIGHT
BY
G. A. Gust
ATTORNEY

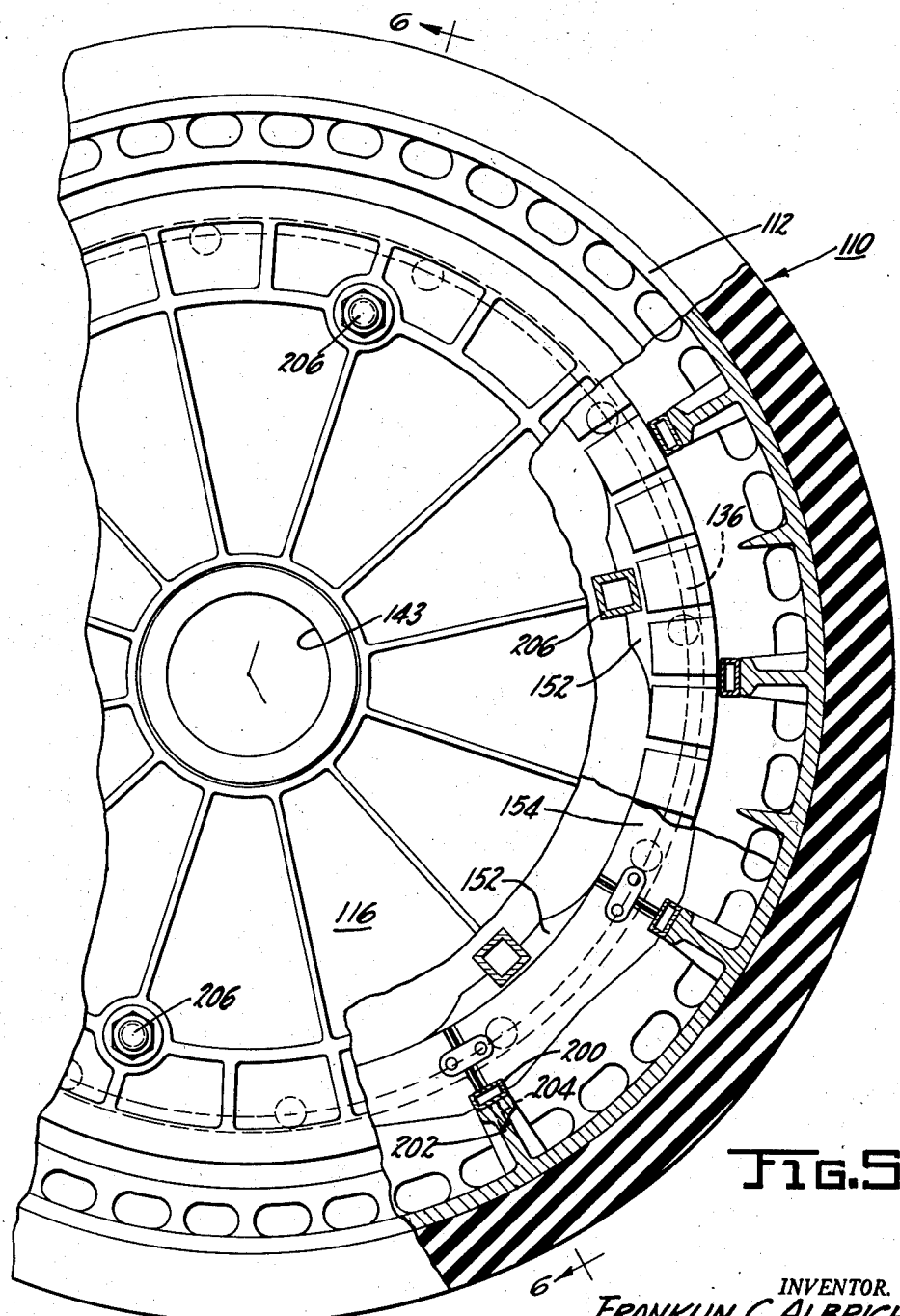

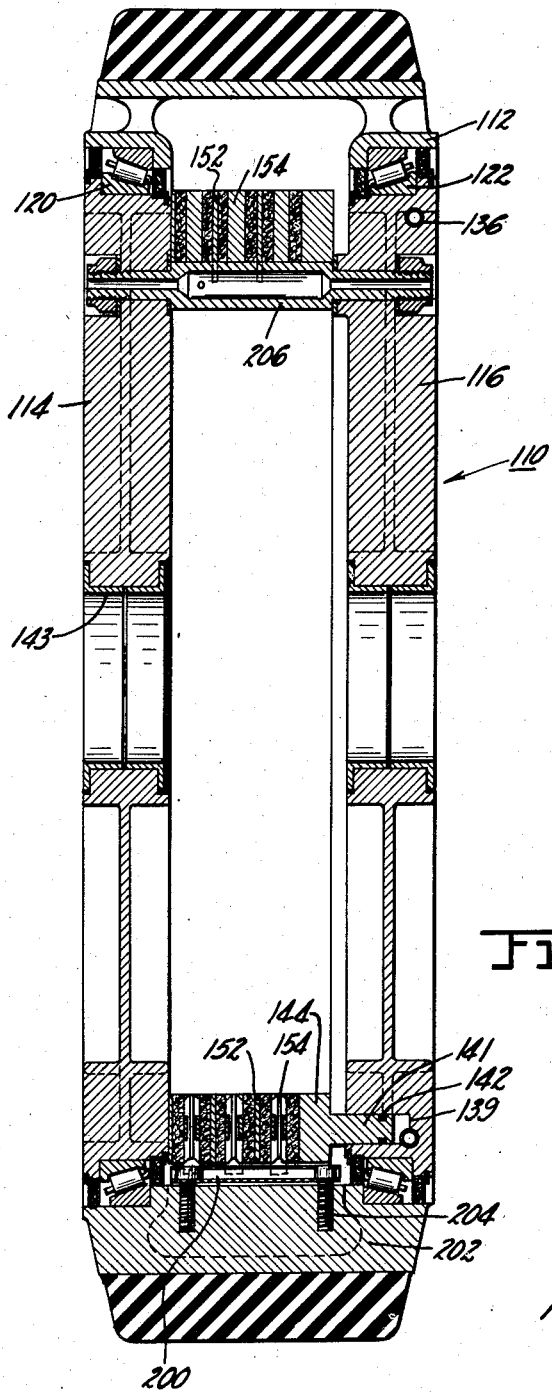

United States Patent Office 2,826,274
Patented Mar. 11, 1958

2,826,274
AIRCRAFT WHEEL AND BRAKE ASSEMBLY

Franklin C. Albright, South Bend, Ind., assignor to Bendix Aviation Corporation, South Bend, Ind., a corporation of Delaware Application December 1, 1949, Serial No. 130,426

3 Claims. (Cl. 188—152)

The present invention relates to an aircraft wheel and brake assembly having the desirable features of relatively narrow width, high strength, and large braking capacity.

A principal object of the present invention is to provide an aircraft wheel and brake assembly having the following relative desirable features: (a) low production cost, (b) simple design, (c) reliable operation, (d) high load capacity, and (e) foolproof servicing. These features are accomplished in the following manner, respectively: (a) the fluid pressure connections to the brake actuators are simplified by removing demountable connection components; (b) the fluid pressure conduit is cast in one side support plate; (c) demountable connections are eliminated where leakage usually occurs; (d) individual circumferentially spaced actuators are used whereby the spaces between actuators become wheel spokes or support ribs; and (e) fewer parts are used providing less chance for the mechanic to make an error.

Another object is to provide a combination wheel support and brake element of extremely simple design which lends itself to economical production and reliable operation. This combination is often referred to hereinafter as a carrier.

Still another object is to provide a carrier having certain constructional characteristics which provide for flexibility of design as exigencies require, and this particular object is generally accomplished by casting a fluid pressure conduit member, such as stainless steel into the carrier. This conduit member can be bent and formed to follow any desired contour without causing any appreciable increase in expense of production or impairing the reliability of operation. As will become clear from the following description, this carrier may be adapted to various types of wheel constructions.

Other objects and objects ancillary thereto will become apparent as the description proceeds.

In the drawings:

Figure 5 is a side elevation of another embodiment of the present invention; and Figure 6 is a sectional view taken substantially on section line 6—6 of Figure 5.

Figure 1:
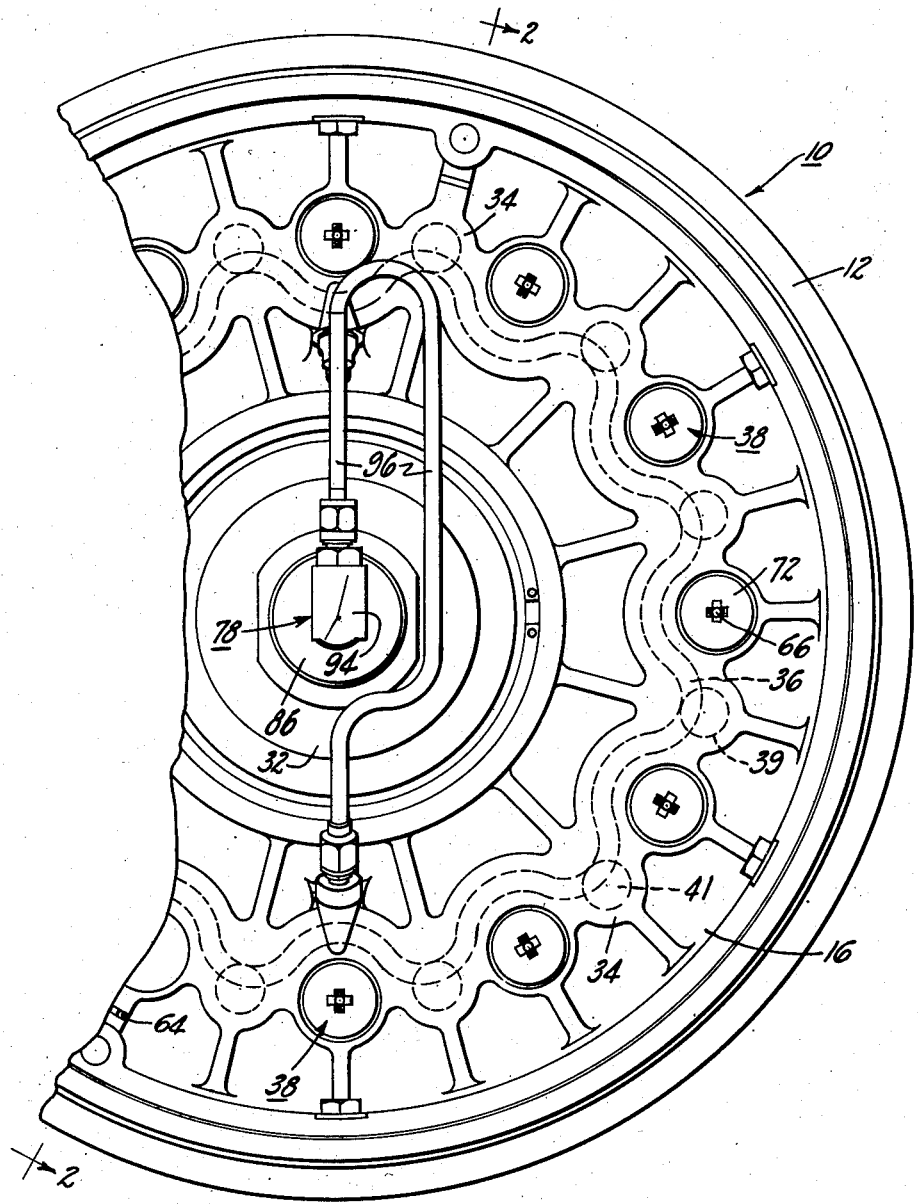
Figure 1 is a partial side elevation of an embodiment of the present invention.
Figure 2:
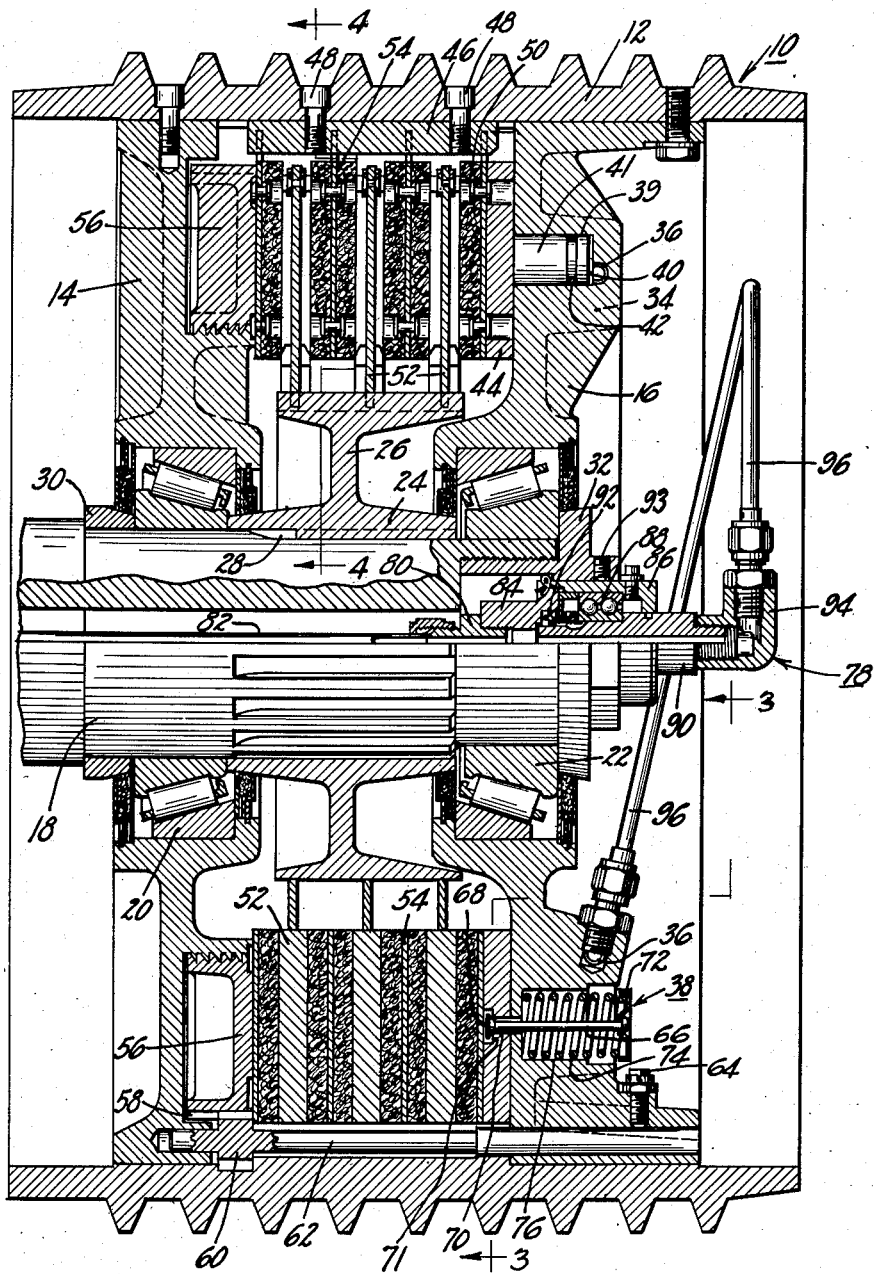
Figure 2 is a sectional veiw taken substantially on section line 2—2 of Figure 1.
Figure 4:
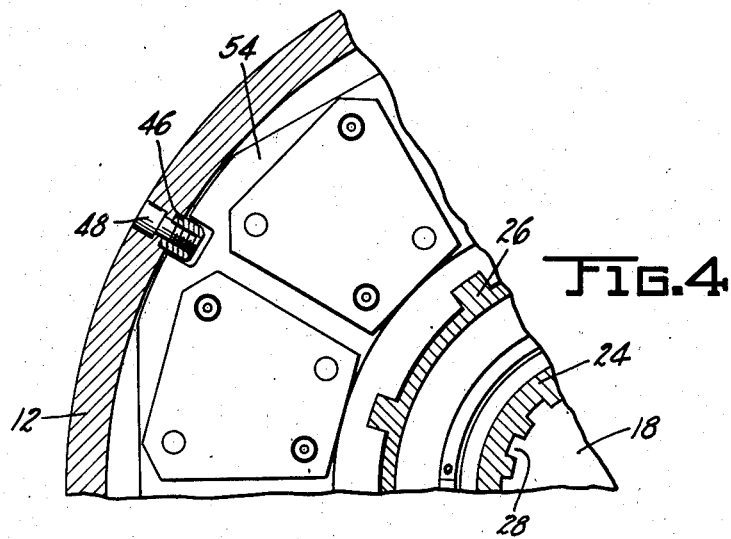
Figure 4 is a partial section taken substantially on section line 4—4 of Figure 2.
Figure 3:
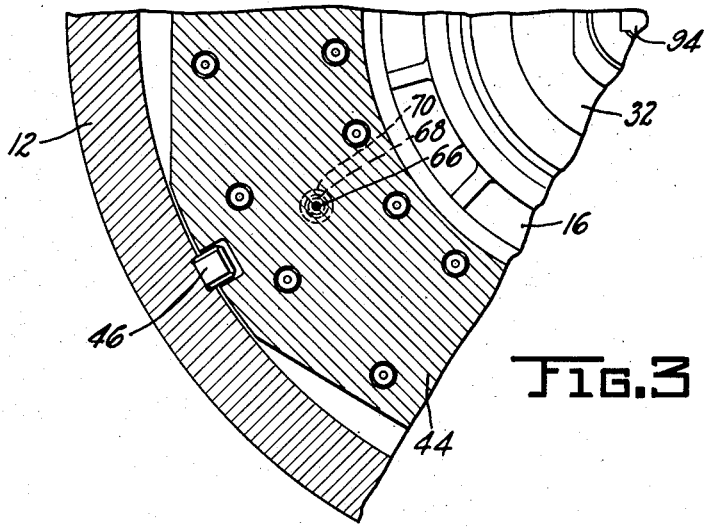
Figure 3 is a partial section taken substantially on section line 3—3 of Figure 2.

Referring to the drawings and more particularly to Figures 1 to 4, a wheel 10, for use with track gear, is comprised to a grooved rim 12, and a pair of side plates or support members 14 and 16 journaled on a hollow axle 18 by means of the spaced bearings 20 and 22, respectively. These bearings are spaced apart by the hub 24 of torque-taking member 26, said hub being provided with internal lands and grooves which fit the splines 28 on axle 18. Spacer ring 30, suitably held in place on axle 18, prevents outward movement of bearing 20 while the annular hub nut 32 holds bearing 22 in place.

The side plate 14 may be of conventional design and provided wiht openings for ventilation and to lighten the weight. Side plate 16, however, is preferably fabricated by casting and is provided with a plurality of circumferentially spaced bosses 34 which serve as hydraulic actuator housings. A stainless steel tube 36, or a tube formed of similarly suitable material, is cast within the side plate 16 to pass near the outside end of each boss 34. In the illustrated version, the tubular member 36 is scalloped or undulated to register with the ends of the bosses 34 and to avoid the return spring assemblies 38. Thus it is seen that the tubing 36 may conveniently be formed to any desired shape without appreciably altering the cost involved in making the carrier 16. This fact of being able to cast in the tube 36 so easily, eliminates the effort of producing a casting with formed passages which always presents the problems of first, how to form a core; second, how to remove it; and third, how to avoid porous leakage of pressure fluid through the walls of the passage. If a material soluble in some solvent is used as a core, it, of course, must be completely removed before final assembly, since a single particle of foreign matter in the brake system can foul it. This removal is not easily accomplished and takes a considerable amount of time and solvent. Further, presuming that all of the core is removed and that no blow holes exist, the walls of the passage must be coated with some composition, impervious to the hydraulic fluid, to fill the pores of the casting. Castings are known to be porous and to allow the passage of fluid therethrough, hence the necessity for using the composition. Compositions known as tung oil and styrene are conventionally used for the stated purpose.

By casting the tubing in place, all of these problems, and others not mentioned, are avoided.

Since the method of producing the support member or carrier 16 is considered to be novel as well as the carrier itself, a description of the method will be included in that of the carrier.

As explained above, the conduit member 36 is cast in the carrier to register with the right-hand ends of the bosses 34. The bosses 34 are then formed with cylinder bores 39 by any suitable method and preferably by means of a drilling tool which is pressed to a depth to just enter the conduit 36. Openings 40 are thereby formed providing communication between the conduit 36 and the bores 39.

This construction eliminates the use of screw type fluid fittings for each bore which obviously makes the unit more reliable, foolproof, and economical to produce.

Pistons 41 provided with sealing rings 42 are reciprocably received in bores 39 to axially shift the brake pressure plate 44 carried for rotation with the wheel 10 on elongated key members 46. Keys 46 are suitably secured to the inner periphery of rim 12 by bolts 48 or the like. Secured to the face of pressure plate 44 is composition lining 50 which is adapted to frictionally engage one of the non-rotatable brake elements 52. Axially movable, rotatable brake elements 54 carrying friction lining and mounted on keys 46 are interdigitated with the stator elements 52 which are keyed for axial movement on torque member 26.

To compensate for lining wear, an adjusting mechanism is provided in the form of annulus 56 threadedly received on an annular projection on support member 14 and provided on its outer periphery with gear teeth 58. A pinion 60 engages gear teeth 58 and is secured to a shaft 62 which protrudes from one side of the wheel.

By rotating this shaft, annulus 56 is shifted axially to compensate for lining wear. A set screw 64 is provided to hold shaft 62 against accidental rotation.

Return spring assemblies 38 release the brakes and each assembly comprises a tension pin 66 having a head 68, said pin 66 passing through opening 70 in plate 44 with head 68 being accommodated in a recess 71. A spring retaining cup 72 is secured to the other end of pin 66 and serves to retain compression spring 74 in cavity 76 formed in carrier 16. Thus it is seen that spring 74 acts through pin 66 to urge pressure plate 44 against carrier 16, the released position, as many assemblies 38 may be used as desired.

Since the actuators 41 rotate with the wheel, a swivel fitting 78 is necessary to transfer pressure fluid from a stationary conduit to one that rotates. The fitting 78 is comprised of an adaptor nut 80 threadedly attached to stationary conduit 82 and a coupling nipple 84. Threadedly received on nipple 84 is a coupling housing 86 enclosing an anti-friction bearing 88 rotatably receiving a tubular swing nipple 90. A fluid seal is effected between swing nipple 90 and coupling nipple 84 by use of a rubber-like sealing member 92 which snugly fits around the left-hand end of nipple 90 and the inner periphery of nipple 84. Thus fluid may pass from stationary conduit 82, through adaptor nut 80, nipple 84, and swing nipple 90. The coupling housing 86 is held against rotation by the set screws 93 in hub nut 32.

Fitted to the outlet end of swing nipple 90 is a suitable right angle connection 94 into which is snugly fitted external conduit 96. The other end of conduit 96 is connected to an opening in conduit 36, thereby completing the hydraulic system of the braking mechanism.

While the operation of the wheel and brake asesmbly is probably apparent from the foregoing description, a brief explanation thereof follows. With wheel 10 rotating and the brakes released, pressure fluid is introduced into conduit 82 which passes through swivel fitting 78, external conduit 96, conduit 36, and into cylinders 39 forcing pistons 41 outwardly against pressure plate 44. The brake elements 52 and 54 are thereby compressed against side plate 14 to generate braking torque.

In releasing the brakes, the pressure in conduit 82 is relieved sufficiently to allow return spring assemblies 38 to shift pressure plate 44 to the right and released position.

In order to exemplify that the design of carrier 10 may be used in a different embodiment, Figures 5 and 6 are now referred to, with similar parts being designated by the same numerals with 100 added.

The wheel 110 is comprised of a rim section 112 journaled by means of large diameter anti-friction bearings 120 and 122 on non-rotatable support members 114 and 116, respectively. Support member or carrier 116 includes the cast-in conduit 136 which opens into circumferentially spaced cylinder bores 139. Pistons 141 having sealing rings 142 are reciprocably received in bores 139. The central openings 143 in support members 114 and 116 are adapted to fit a stationary axle member not shown.

The rotatable brake elements 154 are carried for axial displacement on keys 200 mounted on radially converging supports 202 by any suitable means such as screws 204. The interdigitated non-rotatable brake elements 152 are similarly carried on circumferentially spaced key members 206 secured between support members 114 and 116. Pressure plate 144 is also keyed to key members 206 in juxtaposition with pistons 141 to effect frictional engagement of brake elements 152 and 154. Return springs (not shown) of any desirable design may be used to urge the brake elements out of frictional engagement.

The operation of this embodiment is substantially the same as the one in Figure 1, with the introduction of pressure fluid in conduit 136 causing brake application and relief of such pressure permitting brake release.

The advantages of the present invention are numerous and in addition to those previously recited, the carrier with the cast-in tubing faciltates the use of any number of actuators. In a carrier utilizing a cast-formed passage or conduit and four or less actuators, the distance between actuators becomes relatively great. This leads to difficulty in clearing the passage of foreign matter and in treating the passage walls against porosity. The present invention obviously obviates this difficulty.

Although several embodiments of the invention have been illustrated and described, various changes in the form and relative arrangements of the parts may be made to suit requirements.

I claim:

1. An aircraft wheel and brake assembly comprising a pair of axially spaced relatively non-rotatable wheel support members mounted on a non-rotatable axle member by means of anti-friction bearings, an annular non-rotatable torque-taking member carried on said axle between said bearings, a plurality of annular rotatable brake elements operatively connected to said support members and mounted to be moved axially of the wheel, a plurality of annular non-rotatable brake elements interdigitated with said rotatable brake elements keyed to said torque-taking member and mounted to move into frictional engagement with said rotatable brake elements, one of said rotatable brake elements being carried adjacent the inner side of one of said support members and serving as a brake pressure plate, a plurality of circumferentially spaced actuating cylinders formed in said one of said support members with their axes substantially parallel to the axis of the wheel and with their open ends adjacent said brake pressure plate, a plurality of pistons reciprocably received in said cylinders for forceably engaging said pressure plate to urge said brake elements into frictional engagement against the other wheel support member, a conduit member embraced by said one support member and communicating with said cylinders near the bottoms thereof for the purpose of conducting pressure fluid to the heads of said pistons, and resilient members carried by said one support member for yieldably urging said brake elements out of frictional engagement.

2. A combination aircraft wheel support and brake unit comprising a cast annular member including an inner hub portion, an outer rim portion, an axle member, a plurality of non-rotatable brake elements attached to said axle member, a plurality of rotatable brake elements interdigitated with said non-rotatable brake elements, key means slidably mounting said rotatable brake elements, said key means removably secured to said outer rim portion and circumferentially disposed spokes connecting said inner and outer portions, a plurality of circumferentially spaced cylindrical bosses carried by said spokes, said bosses being provided with cylinder bores formed on axes substantially parallel to the axis of said annular member, with each of said bores reciprocably receiving a piston, said pistons being actuable to forceably urge said brake elements into frictional engagement, and a scalloped tubular member embraced by said annular member which communicates with said cylinders to conduct pressure fluid to the heads of said pistons.

3. An aircraft wheel support and brake unit comprising an annular member including an inner hub portion, an outer rim portion of said annular member, supporting means, a plurality of nonrotatable brake elements which are carried by said supporting means, a plurality of rotatable brake elements interdigitated with said non-rotatable brake elements, key means slidably mounting said rotatable brake elements, said key means being secured to said outer rim portion, a plurality of circumferentially spaced cylindrical bosses carried by said annular member, said bosses being provided with cylinder bores formed on axes substantially parallel to the axis of said annular member with each of said bores reciprocably receiving a piston, said pistons being actuatable to forcibly urge said brake elements into frictional engagement, and a tubular member enclosed within said annular member which communicates with said cylinders to conduct pressure fluid to said pistons.

References Cited in the file of this patent

UNITED STATES PATENTS

| | | |
|---|---|---|
| 1,234,878 | Corvin | July 31, 1917 |
| 1,968,130 | Criley | July 31, 1934 |
| 2,001,599 | Cohen | May 14, 1935 |
| 2,177,213 | Gleasman | Oct. 24, 1939 |
| 2,334,053 | Whitten | Nov. 9, 1943 |
| 2,381,166 | Hollerith | Aug. 7, 1945 |
| 2,381,736 | Goepfrich | Aug. 7, 1945 |
| 2,476,151 | Le Jeune | July 12, 1949 |
| 2,483,362 | Du Bois et al. | Sept. 27, 1949 |

FOREIGN PATENTS

| | | |
|---|---|---|
| 551,993 | Germany | June 8, 1932 |
| 595,437 | Germany | Apr. 11, 1934 |
| 460,824 | Great Britain | Feb. 4, 1937 |